United States Patent
McGinnity et al.

(10) Patent No.: US 11,082,403 B2
(45) Date of Patent: Aug. 3, 2021

(54) INTERMEDIATE NETWORK ENTITY

(71) Applicant: Openwave Mobility Inc., Redwood City, CA (US)

(72) Inventors: Shaun McGinnity, Belfast (GB); Ryujiro Shibuya, Belfast (GB); Aidan McGurn, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 301 days.

(21) Appl. No.: 15/259,970

(22) Filed: Sep. 8, 2016

(65) Prior Publication Data

US 2017/0078328 A1 Mar. 16, 2017

(30) Foreign Application Priority Data

Sep. 10, 2015 (GB) .................................... 1516072

(51) Int. Cl.
*H04L 29/06* (2006.01)
*H04L 9/32* (2006.01)

(52) U.S. Cl.
CPC ........ *H04L 63/0281* (2013.01); *H04L 9/3263* (2013.01); *H04L 63/04* (2013.01); *H04L 63/0823* (2013.01); *H04L 63/166* (2013.01)

(58) Field of Classification Search
CPC ... H04L 63/166; H04L 63/04; H04L 63/0281; H04L 9/3263; H04L 63/0823

(Continued)

(56) References Cited

U.S. PATENT DOCUMENTS

| 6,104,716 | A  | * | 8/2000 | Crichton | ............. | H04L 63/0281 |
| | | | | | | 370/401 |
| 6,996,841 | B2 | * | 2/2006 | Kadyk | ................ | H04L 63/0281 |
| | | | | | | 713/150 |

(Continued)

FOREIGN PATENT DOCUMENTS

| CN | 102932350 A | 2/2013 |
| EP | 1986400 A1 | 10/2008 |
| WO | 2005060202 A1 | 6/2005 |

OTHER PUBLICATIONS

"10th International Conference on Availability, Reliability and Security (ARES)", Aug. 24-27, 2015, IEEE, pp. 389-396, Husak et al, "Network-based HTTPS Client Identification Using SSL/TLS Fingerprinting" See whole document.

(Continued)

*Primary Examiner* — Dant B Shaifer Harriman
(74) *Attorney, Agent, or Firm* — EIP US LLP

(57) ABSTRACT

There is presented a method and apparatus for controlling secure communications in a communications network. An intermediate network element (INE) receives a request from a client to establish a secure connection between the client and a first server. The received request is analysed to determine a client identifier. The INE determines, based on the client identifier whether to attempt to establish a secure connection between the client and the INE. Responsive to a determination not to attempt to establish a connection, the received request is forwarded on to a second server. Responsive to a determination to attempt to establish a connection, a message comprising information for the client to use in establishing a secure connection with the INE is sent to the client.

19 Claims, 7 Drawing Sheets

(58) Field of Classification Search
USPC .......................................................... 726/12
See application file for complete search history.

(56) References Cited

U.S. PATENT DOCUMENTS

| | | | | |
|---|---|---|---|---|
| 7,174,565 B2* | 2/2007 | Kadyk | ................ | H04L 63/0281 |
| | | | | 713/150 |
| 9,077,709 B1* | 7/2015 | Dall | .................... | H04L 63/0823 |
| 9,531,691 B2* | 12/2016 | Gero | .................... | H04L 9/0643 |
| 9,692,736 B2* | 6/2017 | Gero | .................... | H04L 9/0643 |
| 2002/0157019 A1* | 10/2002 | Kadyk | ................ | H04L 63/0281 |
| | | | | 726/4 |
| 2005/0086533 A1* | 4/2005 | Hsieh | .................... | H04L 63/145 |
| | | | | 726/4 |
| 2006/0101510 A1* | 5/2006 | Kadyk | ................ | H04L 63/0281 |
| | | | | 726/12 |
| 2007/0156900 A1* | 7/2007 | Chien | .................... | G06F 21/645 |
| | | | | 709/225 |
| 2008/0130900 A1* | 6/2008 | Hsieh | .................... | H04L 63/145 |
| | | | | 380/278 |
| 2010/0017848 A1 | 1/2010 | Pomerantz | | |
| 2012/0174196 A1* | 7/2012 | Bhogavilli | .......... | H04L 63/1458 |
| | | | | 726/5 |
| 2014/0095865 A1* | 4/2014 | Yerra | .................... | H04L 9/3265 |
| | | | | 713/156 |
| 2014/0223537 A1* | 8/2014 | Islam | .................. | H04L 63/0876 |
| | | | | 726/12 |
| 2015/0046399 A1* | 2/2015 | Fukunaka | ......... | G06F 17/30575 |
| | | | | 707/634 |
| 2015/0106624 A1* | 4/2015 | Gero | .................... | H04L 9/0643 |
| | | | | 713/171 |
| 2015/0304292 A1* | 10/2015 | Dulkin | ................ | H04L 63/0281 |
| | | | | 726/7 |
| 2016/0323201 A1* | 11/2016 | Choen | .................... | H04L 47/801 |
| 2017/0223054 A1* | 8/2017 | Wing | .................... | H04L 63/166 |
| 2017/0302700 A1* | 10/2017 | Gero | .................... | H04L 9/0643 |
| 2018/0123795 A1* | 5/2018 | Norman | ................ | G06F 21/629 |
| 2018/0146010 A1* | 5/2018 | Gero | .................... | H04L 9/0643 |

OTHER PUBLICATIONS

M. Majowski, Jun. 2012, "SSL Ffingerpriting for p0f", [online], Available from: https://idea.popcount.org/2012-06-17-ssl-fingerprinting-for-p0f/ [Accessed Apr. 8, 2016] See whole document.

* cited by examiner

INTERMEDIATE NETWORK ENTITY

CROSS-REFERENCE TO RELATED APPLICATIONS

This application claims the benefit under 35 U.S.C. § 119(a) and 37 CFR § 1.55 to UK Patent Application No. 1516072.4, filed on Sep. 10, 2015, the entire content of which is incorporated herein by reference.

BACKGROUND OF THE INVENTION

Field of the Invention

The present invention relates to intermediate network entities in communication networks, and more particularly to controlling secure communications at an intermediate network entity in a communication network.

Description of the Related Technology

The Transmission Control Protocol (TCP) is a transport layer protocol used between nodes in networks such as the internet. It allows two hosts within a network, for example a client and a server, to establish a direct connection with each other and hence exchange streams of data. Within a TCP connection, encryption protocols, such as the Secure Sockets Layer (SSL) authentication protocol and the Transport Layer Security (TLS) protocol can be employed to provide communications security between the client and the server, for example between a web browser and a website. This might be used, for example, to protect sensitive information such as bank details and the like being exchanged between a web browser and a website.

In the example of SSL, in order to establish a secure (i.e. encrypted) connection between a client and a server, the client and server exchange a number of messages collectively referred to as an "SSL handshake". In an SSL handshake, the client and server exchange information to generate a unique symmetric session key that is then used by each to encrypt data exchanged between them for that session. Before key generation, in the "Server hello" message of the SSL handshake, the server sends the client a server certificate. The client verifies that the certificate is signed by one of its trusted certificate authorities, and if so, may continue with establishing the secure session with the server. However, verifying that the certificate is signed by one of the client's trusted certificate authorities does not guarantee that the certificate actually came from the server with which the client is communicating.

So called "certificate pinning" can be adopted by some clients in order to verify that the server certificate provided in the SSL handshake actually came from the server with which the client believes it is communicating. In certificate pinning, a client stores preconfigured data (e.g. the hash value of the Simple Public Key Infrastructure (SPKI) field) of the genuine certificates of a given server (or equally of a domain or sub-domain). For example, the genuine certificate may be obtained by the client directly form the server/domain out of band, or, in a "trust on first use" system, the certificate provided in first contact with a given server is assumed to be genuine.

During an SSL handshake with a server, the client may compare data of the server certificate received in the "Server hello" message with data it has stored about the genuine certificate of the server/domain with which it is attempting to set up a secure connection. If the data does not match, the client may reject the SSL handshake, and the establishment of an SSL connection fails. This can prevent clients from setting up secure communications with servers that they do not trust.

In some network architectures, an intermediate network element (INE), for example a proxy, may be placed between a client and a server to mediate secure traffic between them. The INE mediates the secure traffic by creating two end-to-end SSL tunnels, one from the client to the INE and another from the INE to the server. In this case, the certificate presented to the client by the INE in the SSL handshake between the client and the INE is different from the certificate of the server with which the client believes it is communicating. In this case, a client utilizing certificate pinning will detect that the received certificate is different from the stored genuine certificate, and hence may reject the SSL handshake. In this case, the establishment of an SSL connection fails.

It is desirable to mitigate such failures in establishment of secure connections.

SUMMARY

According to a first aspect of the present invention, there is provided a method for controlling secure communications in a communications network comprising a client, a server and an intermediate network element between the client and the server, the method comprising: receiving, at the intermediate network element (INE), a request from the client to establish a secure connection between the client and the server; analyzing the received request to determine a client identifier identifying the client to the INE; determining a server identifier identifying the server to the INE; determining based on a combination of the determined client identifier and the determined server identifier whether to attempt to establish a first end-to-end secure connection between the client and the INE; responsive to a determination not to attempt to establish a first end-to-end secure connection between the client and the INE, forwarding the received request on to the server; and responsive to a determination to attempt to establish a first end-to-end secure connection between the client and the INE, sending to the client, in response to the received request, a first message comprising information for the client to use in establishing a secure connection with the INE.

According to a second aspect of the present invention, there is provided an apparatus comprising a processing system arranged to implement the method according to the first aspect.

According to a third aspect of the present invention, there is provided a computer readable medium with a set of instruction stored thereon, which, when executed by a processing system, causes the system to implement the method according to the first aspect.

According to a fourth aspect of the present invention, there is provided a method for identifying a client in a communications network, the method comprising: receiving a message from a client, wherein the message is a message in a security protocol handshake for establishing a secure connection with the client; inspecting the received message to determine a set of options for the security protocol supported by the client; determining, based on the determined set of options, an identity of the client.

In some examples, the received message is a "client hello" message of a Secure Sockets Layer (SSL) or a Transport Layer Security (TLS) handshake.

In some examples, the set of options comprise a cypher suites list and/or an extension types list.

In some examples, the client is an application running on a user equipment.

In some examples, the identity of the client comprises one or both of a client application name and a client version.

In some examples, the message is received at an Intermediate Network Element (INE) between the client and a first server that the client is attempting to establish a secure connection with.

In some examples, the determining an identity of the client comprises: comparing the determined set of options to one or more different sets of options for the security protocol in a data structure, the data structure comprising one or more client identifiers each stored in association with a respective one of the different sets of options.

In some examples, the data structure comprises one or more client attributes associated with each client identity.

According to a fifth aspect of the present invention, there is provided an apparatus comprising a processing system arranged to implement the method according to the fourth aspect.

According to a sixth aspect of the present invention, there is provided a computer readable medium with a set of instruction stored thereon, which, when executed by a processing system, causes the system to implement the method according to the fourth aspect.

Further features and advantages of the invention will become apparent from the following description of embodiments of the invention, given by way of example only, which is made with reference to the accompanying drawings.

DETAILED DESCRIPTION OF CERTAIN INVENTIVE EMBODIMENTS

Figure 1:
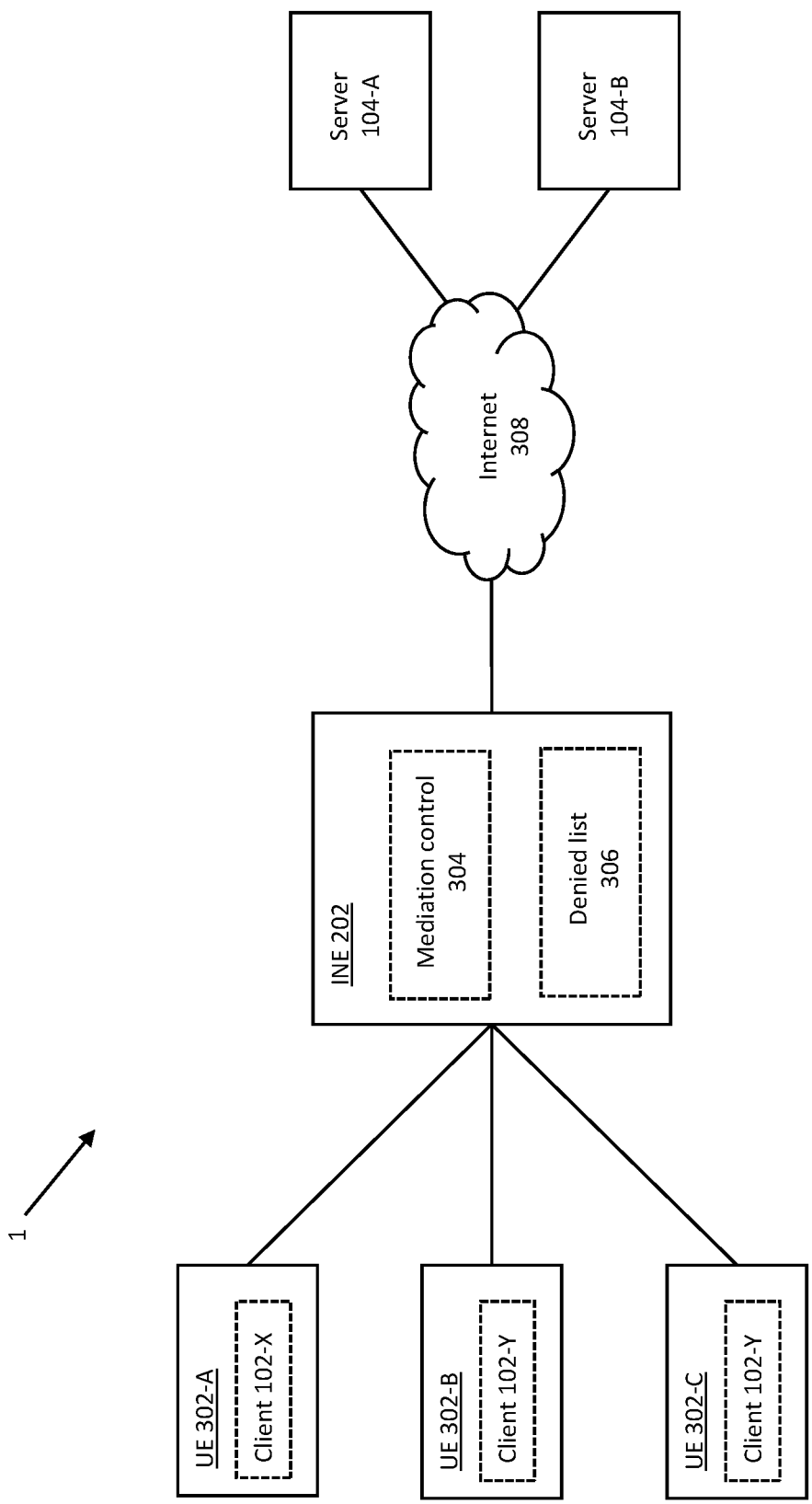
FIG. 1 illustrates schematically an exemplary network.

FIG. 1 illustrates schematically an exemplary network 1 in which an exemplary embodiment of the present invention may be deployed.

Referring to FIG. 1, network 1 comprises User Equipment (UE) 302-A, 302-B, 302-C; Intermediate Network Entity (INE) 202; internet 308 and servers 104-A, 104-B. Each of the UE 302-A, 302-B, 302-C are connected to the internet 308 via the INE 202. Each of the servers 104-A, 104-B are connected to the internet 308. The UE 302-A, 302-B, 302-C run respective clients 102-X, 102-Y, 102-Y. The INE 202 may be, for example a proxy server to proxy traffic between a client 102-X, 102-Y and a server 104-A, 104-B, and may be implemented, for example, on any suitable computer or computer system. The UE 302-A, 302-B, 302-C, the INE 202, and the servers 104-A, 104-B communicate via one or more communication paths, each of which may comprise, for example, a mobile network, a private network, a public network, and/or the internet 308.

The UE 302-A, 302-B, 302-C may be, for example a personal computer, a smart phone, or any other equipment with communication means capable of a connection to a server 104, and with processing means capable of running a client 102-X, 102-Y.

The client 102-X, 102-Y may be, for example, a web browsing application, or any other application that can adopt certificate pinning. The client 102-X may be a different client to the client 102-Y, or a different version of the same client. For example, the client 102-X may be a particular web browser, whereas client 102-Y may be a different web browser, or a different version of the same particular web browser. Client 102-X and client 102-Y may both adopt certificate pinning, neither may adopt certificate pinning, or only one may adopt certificate pinning. In the examples described below, it is assumed that client 102-X does not adopt certificate pinning, but client 102-Y does adopt certificate pinning.

The servers 104-A, 104-B may be any suitable processing device, for example, web servers that are used to host a website or domain. The servers 104-A, 104-B may host different domains, and each server 104-A, 104-B may have a respective, different, server certificate associated therewith. Alternatively, a certificate may be associated with a domain. If the servers 104-A, 104-B host a common domain or sub-domain, then the certificate associated with the common domain or sub-domain may be used for both servers 104-A, 104-B.

The INE 202 supports a mediation function (not shown), for example to provide layer 7 (L7) mediation functions for Hyper Text Transfer Protocol Secure (HTTPS) traffic between a client 102-X, 102-Y and a server 104-A, 104-B. The INE 202 comprises a mediation control component 304 for controlling the mediation of secure communications between a client 102-X, 102-Y and a server 104-A, 104-B. For example, the mediation control 304 controls whether or not the INE 202 mediates secure traffic between a client 102-X, 102-Y and a server 104-A, 104-B. If the INE 202 is controlled to mediate, the INE 202 mediates secure communications between a client 102-X, 102-Y and a server 104-A, 104-B for example by establishing two end-to-end SSL/TLS tunnels, one between the client 102-X, 102-Y and the INE 202, and one between the INE 202 and the server 104-A, 104-B (i.e. terminating the SSL/TLS secure tunnel at the INE 202). On the other hand, if INE 202 is controlled not to mediate, the INE does not terminate an SSL/TLS tunnel, and instead merely forwards data between a client 102-X, 102-Y and a server 104-A, 104-B (i.e. the communications between a client 102-X, 102-Y and a server 104-A, 104-B bypass the INE 202).

The INE 202 maintains a "denied list" 306 (also referred to herein as a "blacklist"), accessible by the mediation control component 304, which, as described in more detail below, lists combinations of clients 102-X, 102-Y and servers 104-A,104-B (or domains hosted thereby) between which the INE 202 should not attempt to mediate secure communications. The denied list 306 may be stored remote to the INE 202, and accessible by the INE 202 via a wired and/or wireless connection. The denied list 306 may be associated with a single INE 202, or be centralized so as to be associated with a plurality (not shown) of INEs 202. The denied list 306 may be updated by the INE (or INEs) 202, or may be updated manually or automatically via other entities. For example, the list may be populated with known combinations of clients and servers between which the INE 202 should not attempt to mediate secure communications. As another example, the denied list 306 may be updated to reflect corresponding client updates, for example client software updates to a new version of the same client, for which it may also be known (or inferred) that the INE 202 should not attempt to mediate secure communications.

The mediation control component 304 refers to denied list 306 to inform whether or not to mediate communications between a given combination of client 102-X, 102-Y and server 104-A, 104-B.

The signaling between a client 102, INE 202, mediation control component 304, denied list 306 and server 104 components of a network 1 according to exemplary embodiments of the present invention will now be described with reference to FIGS. 2 to 5.

Figure 2:
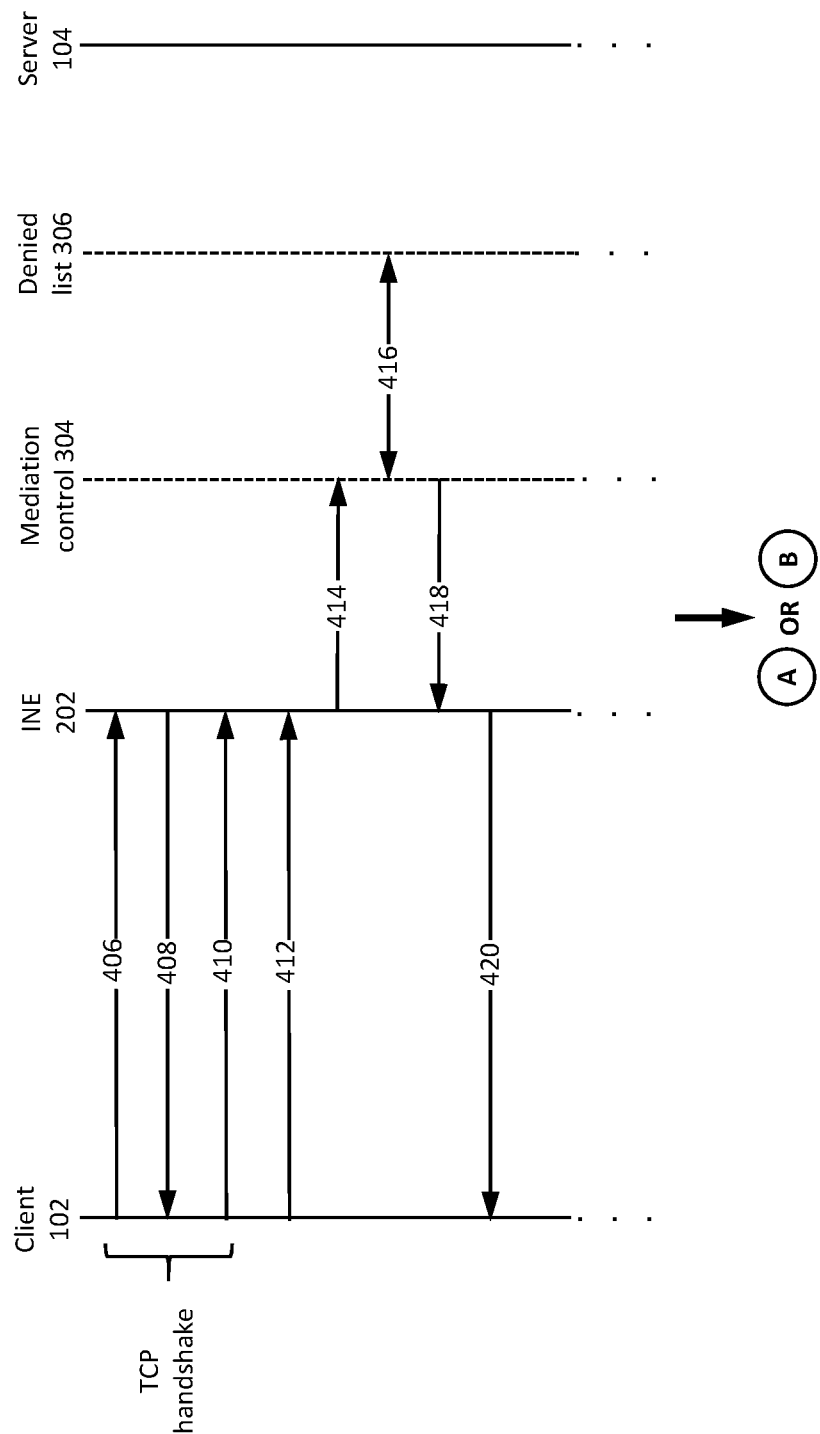
FIG. 2 illustrates schematically a part of an exemplary signaling diagram according to an embodiment.

FIG. 2 illustrates schematically a part of a signaling diagram of the communications between a client 102, INE 102, mediation control component 304, denied list 306 and server 104 according to an exemplary embodiment of the present invention.

Referring to FIG. 2, first, the client 102 attempts to establish a TCP connection with the INE 202 via a TCP handshake. The TCP handshake begins with the client 102 requesting a TCP connection with the server 104 by sending a TCP SYN (synchronize) message 406 intended for receipt by the server 104. This TCP SYN message 406 is received (intercepted) by the INE 202, and the INE 202 then acknowledges the request by sending a TCP SYN-ACK (synchronize-acknowledgement) message 408 to client 102. The client 102 then responds to the message 408 by sending a TCP ACK (acknowledgement) message 410 back to the INE 202, and a TCP connection between the client 102 and the INE 202 is established. It should be noted that although a TCP connection between the client 102 and the INE 202 has been established, the client 102 believes that it has established a TCP connection with the server 104. The INE 202 therefore terminates the TCP connection transparently with respect to the client 102.

Next, the client 102 attempts to establish an SSL connection with the server 104 via an SSL handshake. The SSL handshake begins with the client 102 sending a "Client Hello" message 412 (intended for server 104) which is intercepted by the INE 202. The message 412 is a request from the client 102 to establish a secure connection between the client 102 and a server identified in the request. The "Client Hello" message 412 comprises information on the SSL protocol version, a session ID, a cipher suites list (i.e. a list of combinations of authentication, encryption, message authentication code (MAC), and key exchange algorithms that the client can use), and client hello extensions list (i.e. a list of extensions the client supports) being used by the client.

In response to receiving the "Client Hello" message 412, the INE 202 analyses the "Client Hello" message 412 to determine a client identifier that identifies to the INE 202 the client 102 that sent the message 412, and a server identifier that identifies to the INE 202 the server 104 (or equally the domain or sub domain) that the client 102 believes it is establishing an SSL connection with. The INE 202 passes this information onto mediation control 304 in a first control message 414. For example, the information identifying the particular client 102 may be a concatenation of the cipher suites list and/or the extension types list given in SSL headers of the "Client Hello" message 412. The concatenation may be used by INE 202 to reliably discriminate between different clients (e.g. between client 102-X and client 102-Y) because, typically, the concatenation of the cipher suites list and the extension types list will be different for different clients. For example, it may be known that a particular client application (e.g. browser type a) sends cipher suites {1, 2, 3 4} in that order, a different client application (e.g. bowser type b) sends cipher suites {2, 3, 4, 5} in that order and a yet different client application (e.g. browser type c) may send cipher suites {2, 3, 1, 4} etc. and likewise for extensions.

Accordingly, observed cipher suites or extensions may be used to query a database of cipher suites or extensions and the particular apps or devices known to use those cipher suites or extensions in order to identify the likely identity of the app or device using the observed cipher suites or extensions. Although in theory different clients (e.g. client 102-X and client 102-Y) may have the same concatenation of cipher suites list and/or extension types list, this situation will be rare.

Information identifying the server 104 (or equally the domain or sub domain) that the client 102 believes it is establishing an SSL connection with is obtained from the "Client Hello" message 412. For example, the server identifier may be a Server Name Indication (SNI) extension of the "Client Hello" message 412. Alternatively, the INE 202 may identify the server 104 with which the client 102 is attempting to establish a connection based on the original destination address in an IP header of the IP packet encapsulating the "Client Hello" message 412. In either case, the identity of the server 104 may be obtained from the request message 412. Alternatively, however, the INE 202 may identify the server 104 with which the client 102 is attempting to establish a secure connection based on the original destination address (for example the destination IP address) in the IP header of the IP packet encapsulating the TCP SYN message 406, or the TCP ACK acknowledgement message 410, or any other messages sent from the client 102 intended for the server 104 and intercepted by the INE 202. In this case, the INE 202 need not necessarily identify the server 104 with which the client 102 is attempting to establish a secure connection by analyzing the "Client Hello" message 412

In response to receiving the first control message 414, the mediation control 304 then checks 416 the denied list 306 to see if the combination of client 102 identifier and server 104 identifier provided in the first control message 414 has been recorded in the denied list 306 as a combination that resulted in an SSL handshake rejection. In the present example described with reference to FIGS. 2 to 4, the combination of client 102 identifier and server 104 identifier provided in the first control message 414 is not present in the denied list. The mediation component 304 therefore sends a second control message 418 to the INE 202 indicating that the combination of the client 102 identifier and the server 104 identifier provided in the first control message 414 was not found in the denied list 306, and hence that the INE 202 may proceed to issue a "Server hello" message 420 to the client 102.

Although in this example the combination of client 102 identifier and server 104 identifier is compared to entries in a denied list to determine whether or not the INE 202 should issue "Server hello" message 420 to the client 102, this need not necessarily be the case.

In one alternative example, the client 102 may be an application that only has a limited number of servers 104 with which it can communicate. For example, an application produced by the owners of a particular domain may be configured to only communicate with that domain. The application may be known to not apply certificate pinning for all of the (limited number of) servers with which it may communicate, and hence it may be inferred that any client hello message 412 received from this application may be replied to by the INE issuing a server hello message 420 to the client 102. The application may have an identifier that uniquely identifies the application to the INE 202 and this identifier may be stored in association with an indication that this application will not adopt certificate pinning. Hence the INE 202 may determine based on the client identifier alone to issue a server hello message 420 to the client 102. It will therefore be appreciated that in such cases, the INE 202 need not determine the server 104 identity, nor compare the combination of the client 102 identifier and the server 104 identifier to the denied list, in order to determine that the INE 202 may proceed to issue a "Server hello" message 420 to the client 102.

In another alternative example, the INE 202 may use the client 102 identifier to perform a lookup of the client identity, for example the name of the client and a particular version number of the client. For example, if the client is a browser, the client identity may be "IEv11.0" or the like. Client 102 identifiers may be stored in association with the corresponding client identity in a look-up table accessible to the INE 202. The look-up table may be, for example, pre-populated with client identities and their associated client 102 identifiers (e.g. cypher suites list and extension types list). If the INE 202 finds a match of the determined client 102 identifier in the look up table, the INE 202 may then extract the associated client 102 identity, and hence determine the identity of the client 102 sending "Client hello" message 412. Having determined the client 102 identity, the INE may then determine the servers 104 with which the identified client 102 is known to adopt certificate pinning. For example, this information may also be stored in the look-up table, or the INE may look up this information from a different source. The INE 202 may then determine whether or not to issue a "Server hello" message 420 to the client accordingly. For example, if the INE 202 determines that the identified client 102 is not known to adopt certificate pinning (or known not to adopt certificate pinning) for the server 104 with which the client 102 is attempting to establish a secure communication, then the INE 202 may determine to issue "Server hello" message 420 to the client.

In any case, in response to a determination that the client 102 is not known to adopt certificate pinning for the server 104, the mediation component 304 sends a second control message 418 to the INE 202 indicating that the INE 202 may proceed to issue a "Server hello" message 420 to the client 102.

In response to receiving the second control message 418, the INE 202 sends the "Server hello" message 420, i.e. a message comprising information for the client to use in establishing a secure connection with the INE 202. The "Server hello" message 420 comprises the INE's choice of protocol version, a session ID, the cipher suite selected by the INE, any extensions, and the ME's certificate.

Figure 3:
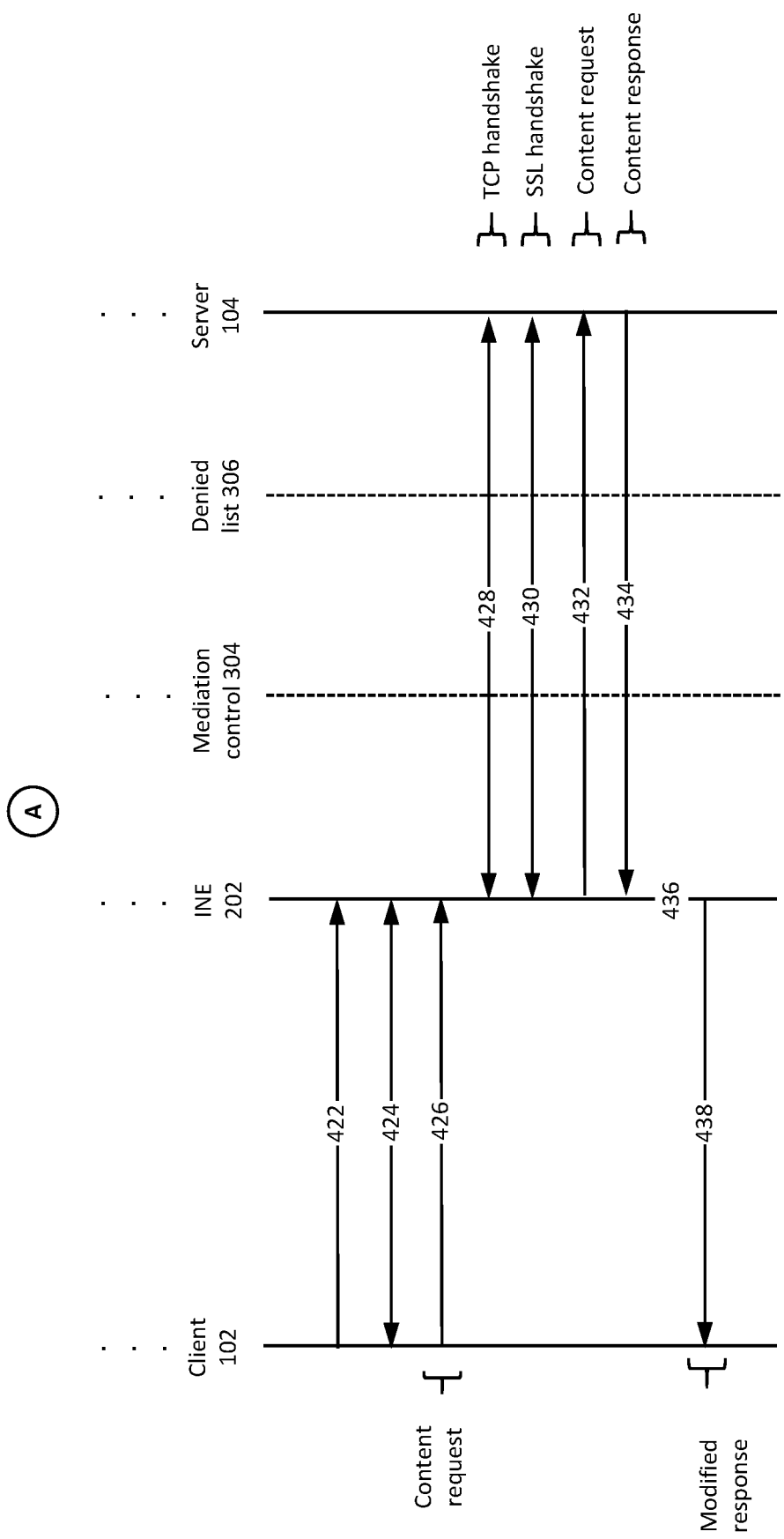
FIG. 3 illustrates schematically a part of an exemplary signaling diagram according to an embodiment.

FIG. 3 illustrates the continuation of the signaling diagram of FIG. 2 according to an exemplary embodiment in the situation that the client 102 does not adopt certificate pinning (indicated in the figures by a circled letter "A"). As such, the client 102 here is an example of client 102-X as described above with reference to FIG. 1.

Referring now to FIG. 3, since the client 102 does not adopt certificate pinning, in response to receiving the "Server hello" message 420, (among other things) the client 102 merely verifies that the certificate received in the "Server hello" message 420 is signed by a certificate authority trusted by the client 102. If the certificate authority that signed the INE's 202 certificate is trusted by the client 102, then the client 102 will continue with the SSL handshake procedure by generating a so called "pre-master secret" and sending it to INE 202 in "pre-master secret" message 422. Hence, in this case where the client 102 does not adopt certificate pinning, the client 102 continues the SSL handshake with INE 202, even though the client believes it is conducting the SSL handshake with server 104.

The client 102 and the INE 202 then use the pre-master secret to compute, independently, a master key with which communications between the client 102 and INE 202 may be encrypted. The client 102 and INE 202 send further SSL messages 424 to each other to indicate that the exchange was successful, and that further communications from between them will be encrypted using the master key. The further SSL messages 424 conclude the SSL handshake, and the client 102 and the INE 202 may now communicate application data securely.

The client 102, at some point, sends a request message 426 (intended for server 104) to the INE 202, for example providing application data to the server 104, or requesting data from the server 104, or the like. For example the request message 426 may be a HTTPS request message. The request message 426 is encrypted by the client 102 using the master key associated with the secure connection between client 102 and INE 202.

The INE 202 receives and decrypts the request message 426 using the master key associated with the secure connection between client 102 and INE 202. In response to receiving the request message 426, the INE 202 establishes a TCP connection with the server 104 via a TCP handshake 428. The messages exchanged between INE 202 and server 104 in TCP handshake 428 are similar to messages 406 to 410 exchanged between client 102 and INE 202 (i.e. they are standard messages of a TCP handshake), and so will not be described again. The INE 202 may identify the server 104 with which it is to establish a TCP connection based on the request message 426 received from the client 102, for example, if the message 426 is a HTTPS request message, by analyzing the host field of the HTTPS header of the (decrypted) HTTPS request message. As another example, in the case where a HTTP header is not found, or if the request message 426 is a non-HTTP request, the INE 202 may identify the server 104 with which it is to establish a TCP connection based on the original destination address (for example the destination IP address) in the IP header of the IP packet encapsulating the TCP SYN message 406, or the TCP ACK acknowledgement message 410, or any other message sent from the client 102 intended for the server 104 and intercepted by the INE 202. In another example, the INE 202 may determine that the server with which it is to establish a TCP connection is other than the server 104 with which the client 102 was attempting to establish a connection. This determination may be made, for example, based on one or more policies available to the INE 202. For example, a policy may dictate that the particular request message 426 is to be served by a particular server. This determination may be made based on other information, for example, traffic steering information such as information relating to the date, time of day, network congestion, client information, information contained in the request message itself, or combination of such information. Therefore, although for simplicity the remainder of this description refers to the example of the server 104 being the server with which the client 102 was attempting to establish a connection, it will be appreciated that this need not necessarily be the case.

Once a TCP connection is established between INE 202 and server 104, the INE 202 establishes a secure connection with server 104 via SSL handshake 430. The SSL handshake 430 comprises communications between INE 202 and server 104 similar to the communications 412, and 420 to 424 described above between client 102 and INE 202, and so will not be described again.

The INE 202 need not necessarily be dependent on receiving the request message 426 in order to establish a TCP connection (and thereafter an SSL connection) with the server 104. For example, if an SSL connection is established between the client 102 and the INE 202, but the INE 202 does not receive a request message 426 from the client 102 within a certain time period, the INE 202 may automatically establish a TCP connection (and thereafter an SSL connection) with the server 104. As explained above, the INE 202 may identify the server 104 with which to establish a TCP/SSL connection from the original destination address (for example the destination IP address) in the IP header of the IP packet encapsulating the TCP SYN message 406, or the TCP ACK acknowledgement message 410, or any other message sent from the client 102 intended for the server 104 and intercepted by the INE 202. In this case, the client 102 may send a request message 426 at a later stage, i.e. after the secure connection between the INE 202 and the server 104 has been established. This may also be the case, for example, where the layer 7 protocol used by the client 102 is not HTTP, for example if request message 426 is non-HTTP.

Once a secure connection has been established between INE 202 and server 104, the INE 202 forwards the request message 426 received from the client 102 to the server 104 as forwarded request message 432 to the server 104. It will be appreciated that the forwarded request message 432 is encrypted by the INE 202 according to the master key associated with the secure connection between INE 202 and server 104, before being sent to the server 104 as the forwarded request message 432. Optionally, the INE 202 may perform a function (not shown in FIG. 3) on the decrypted request message 426 before sending it to the server 104 as the forwarded message 432. The function may be any function of a HTTP proxy server. For example, the function may be any function of a HTTP proxy, for example, request transformation, content caching, redirection, access control and the like. For example, the performed function may be to modify the request message 426 by inserting data in and/or removing data from the request message 426, or to analyze the request message 426 or the content of the request message 426 and perform a function based on the analysis, for example a request screening service. Alternatively, the INE 202 may not analyze or modify the request message 426. The analysis and/or modification of the request message 426 (or lack thereof) may be based, for example, on policies stored at or obtainable by the INE 202. These policies may be, for example, specific to a specific client 102, user of the client 102, user information associated with the user of the client 102, other client 102 context information such as location information or the like, or specific to a specific time of day, date, or to a given network congestion information or the like. The policies may also be specific to a specific server 104 (or equally domain or subdomain served thereby), or a specific combination of server 104 and client 102.

The server 104 receives the forwarded request message 432, and decrypts it using the master key associated with the secure connection between the INE 202 and the server 104. The server 104 then analyses the forwarded request message 432 and takes action as appropriate. For example if the forwarded request message 432 is a request for content, the server 104 retrieves the requested content, and generates a response message 434 comprising at least a portion of the requested content.

In response to receiving the message 432, the server 104 sends a response message 434 (intended for client 102) to INE 202, encrypted by the server 104 according to the master key associated with the secure connection between INE 202 and server 104.

In response to receiving the response message 434, the INE decrypts the message 434 according to the master key associated with the secure connection between INE 202 and server 104. Optionally, the INE 202 may then perform a function 436 on the decrypted response message 434. The function 436 may be any function of a HTTP proxy, for example, response transformation, content caching, redirection, access control and the like. For example, the INE 202 may modify the response message 434 by inserting data in and/or removing data from the response message 434, or analyze the response message 434 or the content of the response message 434 and perform a function based on the analysis, for example a content screening service. Alternatively, the INE 202 may not analyze or modify the response message 434. The analysis and/or modification of the response message 434 (or lack thereof) may be based, for example, on policies stored at or obtainable by the INE 202. These policies may be, for example, specific to a specific client 102, user of the client 102, user information associated with the user of the client 102, other client 102 context information such as location information or the like, or specific to a specific time of day, date, or to a given network congestion information or the like. The policies may also be specific to a specific server 104 (or equally domain or subdomain served thereby), or a specific combination of server 104 and client 102. The policies may be the same as, related to, or different from, the policies mentioned above with respect to the decrypted request message 426.

The INE 202 encrypts the modified (or otherwise) response according to the master key associated with the secure connection between INE 202 and client 102 and sends it to client 102 as a message 438.

The client 102 receives and decrypts message 438 according to the master key associated with the secure connection between INE 202 and client 102, and takes action based on the message 438. For example, the message 438 may contain at least a portion of the content requested by the client 102 in request message 426, and so the client may analyze the message 438 to obtain the content and utilize it.

In the example of FIG. 3 (i.e. situation "A") described above, the client 102 did not adopt certificate pinning. As a result, the client 102 accepted the certificate provided to it by the INE 202, even though it was associated with the INE 202 and not the server 104 with which the client 102 believed it was communicating securely, and hence the INE 202 was able to successfully transparently mediate secure communications between the client 102 and the server 104.

Figure 4:
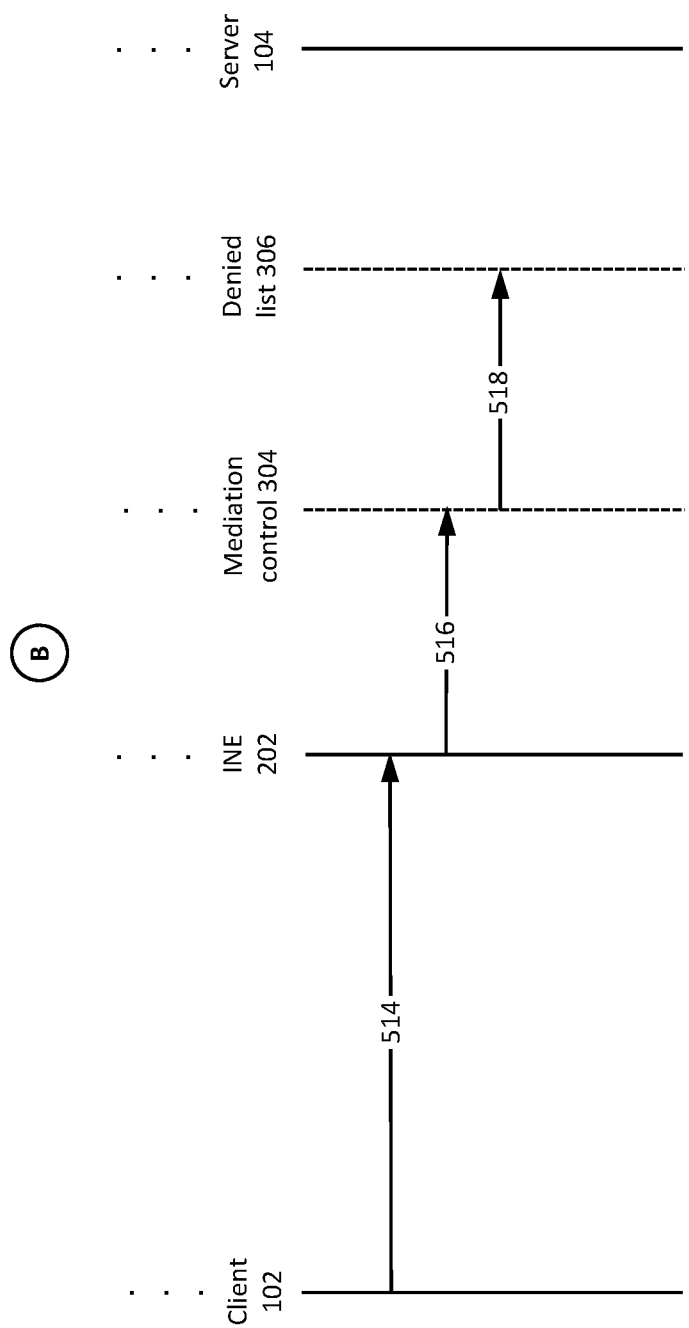
FIG. 4 illustrates schematically a part of an exemplary signaling diagram according to an embodiment.

FIG. 4 illustrates the continuation of the signaling diagram of FIG. 2 in the situation that the client 102 does adopt certificate pinning (the situation indicated in the figures by a circled letter "B"). As such, the client 102 here is an example of client 102-Y as described above with reference to FIG. 1.

Referring now to FIG. 4, since the client 102 does adopt certificate pinning, in response to receiving the "Server hello" message 420 illustrated in FIG. 2, the client 102 checks the certificate included in the "Server hello" message 420 against preconfigured data about the certificate of the server 104 with which it believes it is communicating. For example, the client 102 may have stored a hash value of the SPKI field of the genuine certificate of the server 104. If the client 102 does have stored data of the genuine certificate of the server 104, the client 102 compares the stored data with the INE's certificate. For example, the client 102 may calculate a hash value of the SPKI field of the INE's certificate received in the "Server hello" message 420, and compare it to the stored hash value of the SPKI field of the genuine certificate of the server 104. In the present example, the values will not match, and so the client 102 will not verify the authenticity of the certificate provided by the INE 202 in "Server hello" message 420, and hence will reject the SSL handshake.

The client sends an alert message 514 to INE 202 indicating that the SSL handshake has been rejected. The alert message 514 may be in the form of an SSL Alert message, for example. The alert message 514 may alternatively or additionally be in the form of a TCP Reset message to the INE 202 to reset the TCP connection between the client 102 and the INE 202, or a TCP close message to the INE 202 to close the TCP connection between the client 102 and the INE 202. Any one of a SSL Alert message, a TCP reset message, and a TCP close message is indicative that the SSL handshake will not proceed. The failed connection between the client 102 and the INE 202 is unrecoverable and is dropped.

In response to receiving alert message 514, the INE 202 sends a third control message 516 to mediation component 304 to inform it that the SSL handshake for the present combination of client 102 and server 202 has been rejected. The third control message 514 may comprise, for example, information identifying the client 102 (for example a concatenation of the cipher suites list and the extension types list given in message 504), information identifying the server 104 (or equally the domain or sub domain) that the client 102 attempted to establish a secure connection with, and an indication that the combination resulted in failure of the SSL handshake. The failure of the SSL handshake in the manner described above is indicative of the rejection of the INE's certificate due to certificate pinning by the client 102, because there is no other reasonable cause for the client 102 to reject at this stage of the handshake where the INE's certificate is itself technically valid, and the overall SSL handshake protocol is otherwise correct.

Mediation component 304 communicates 518 with denied list 306 to store the information provided in the third control message 514 in denied list 306, i.e. to update the denied list with the client 102/server 104 combination. For example, the denied list may store in association the information identifying the client 102 (for example a concatenation of the cipher suites list and the extension types list given in message 504), and information identifying the server 104 (or equally the domain or sub domain) that the client 102 attempted to establish a secure connection with.

The inclusion of a particular client 102/server 104 combination on the denied list 306 indicates, for example, that the particular client 102 uses certificate pinning for that particular server 104 (or equally domain or subdomain), and hence mediation of secure communications there between by a INE 202 will likely be unsuccessful. This inference can be extended to all instances of the particular client 102/server 104 combination, regardless of the particular UE 302-A, 302-B, 302-C on which the client 102 is running, or which particular infrastructure the server 104 (or equally domain or sub-domain) is running.

As a result, (as is described in more detail below) in future mediations, the mediation control 304 may refer to the denied list to determine if mediation between a particular combination of client 102 and server 104 will likely result in a failed handshake, and hence that it should not attempt to mediate communications between a given client 102 and server 104.

The way in which the INE 202 may use the denied list 306 to avoid such secure connection failure according to an exemplary embodiment will now be described with reference to FIG. 5.

Figure 5:
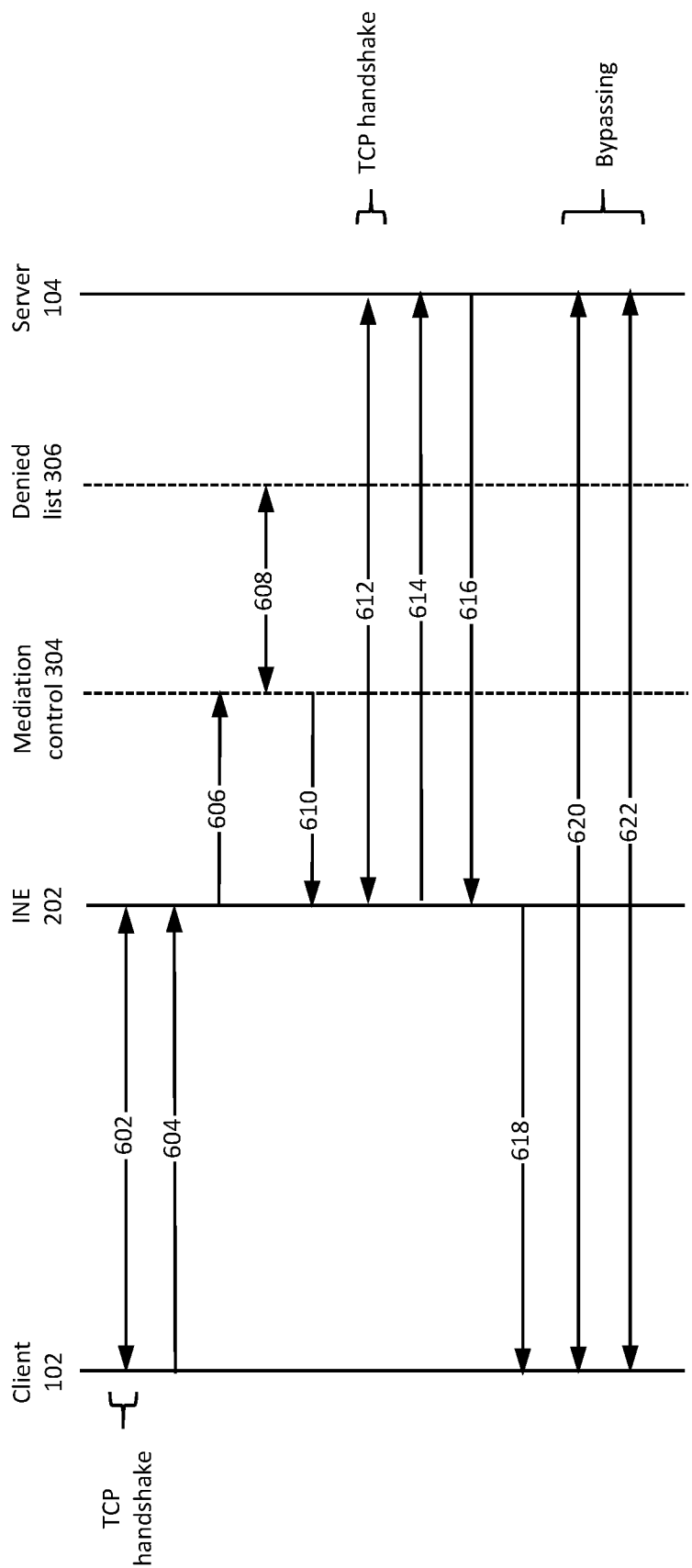
FIG. 5 illustrates schematically an exemplary signaling diagram according to an embodiment.

FIG. 5 illustrates schematically a signaling diagram of the communications between a client 102, INE 102, mediation function 304, denied list 306 and server 104 according to an exemplary embodiment of the present invention.

Referring to FIG. 5, in a similar way to as described above with reference to FIG. 2, client 102 establishes a TCP connection with INE 202 via TCP handshake 602. It should be noted again that although a TCP connection between the client 102 and the INE 202 has been established, the client 102 believes that it has established a TCP connection with the server 104.

The client 102 then, in an attempt to establish a secure connection with server 104, sends Client hello message 604, which is received (intercepted) by INE 202. The Client hello message 604 comprises information on a cipher suites list, and a client hello extensions list being used by the client.

The INE 202 analyses the 'Client hello' message 604 and extracts information identifying the client 102 that sent the message 604 (for example a concatenation of the cipher suites list and the extension types list given in message 604), as well as information identifying the server 104 (or equally the domain or sub domain) that the client 102 believes it is establishing a secure connection with. This extracted information is then passed onto mediation control 304 in a first control message 606.

In response to receiving the first control message 606, the mediation control component 304 checks 608 the denied list 306 to see if the combination of client 102 identity and server 104 identity provided in message 606 has been recorded in the denied list 306 as a combination that resulted in an SSL handshake rejection. In the present example described with reference to FIG. 5, the combination of client 102 identity and server 104 identity provided in message 606 is present in the denied list 306. This may be because INE 202 has previously attempted, and failed, to mediate secure communications between the identified client 102/server 104 combinations. Alternatively, this may be because denied list 306 has been pre-populated, for example remotely, with client 102/server 104 combinations that are known to result in failed SSL handshakes, or that have been recorded by other proxies 202 as combinations that have resulted in a failed SSL handshake. In any case, in response to the combination of client 102 identity and server 104 identity provided in message 606 being present in the denied list 306, the mediation control component 304 sends a second control message 610 to the INE 202 indicating that the combination of the client 102 identity and the server 104 identity provided in message 506 was found in the denied list 306, and hence that the INE 202 should not proceed to issue a "Server hello" message to the client 102.

Although in this example the combination of client 102 identifier and server 104 identifier is compared to entries in a denied list to determine whether or not the INE 202 should issue "Server hello" message to the client 102, this need not necessarily be the case.

In one alternative example, the client 102 may be an application that only has a limited number of servers 104 with which it can communicate. For example, an application produced by the owners of a particular domain may be configured to only communicate with that domain. The application may be known to apply certificate pinning for all of the (limited number of) servers with which it may communicate, and hence it may be inferred that any client hello message 604 received from this application should not be replied to by the INE issuing a server hello message to the client 102. The application may have an identifier that uniquely identifies the application to the INE 202 and this identifier may be stored in association with an indication that this application adopts certificate pinning for all servers with which it may communicate. For example, a denied client list, may be pre-populated with client 102 identifiers for applications known to adopt certificate pinning for all servers with which the respective applications communicate. The INE 202 may first compare a determined client 102 identifier with client identifiers in the denied client list to determine whether or not the client 102 adopts certificate pinning. Hence the INE 202 may determine based on the client 102 identifier alone to not issue a server hello message to the client 102. It will therefore be appreciated that in such cases, the INE 202 need not determine the server 104 identity, nor compare the combination of the client 102 identifier and the server 104 identifier to the denied list, in order to determine that the INE 202 should not issue a Server hello message to the client 102.

In another alternative example, the INE 202 may use the client 102 identifier to perform a lookup of the client identity, for example the name of the client and a particular version number of the client. For example, if the client is a browser, the client identity may be "IEv11.0" or the like. Client 102 identifiers may be stored in association with the corresponding client identity in a look-up table accessible to the INE 202. The look-up table may be, for example, pre-populated with client identities and their associated client 102 identifiers (e.g. cypher suites list and extension types list). If the INE 202 finds a match of the determined client 102 identifier in the look up table, the INE 202 may then extract the associated client 102 identity, and hence determine the identity of the client 102 sending client hello message 412. Having determined the client 102 identity, the INE may then determine the servers 104 with which the identified client 102 is known to adopt certificate pinning. For example, this information may also be stored in the look-up table, or the INE may look up this information from a different source. The INE 202 may then determine whether or not to issue a "Server hello" message to the client accordingly. For example, if the INE 202 determines that the identified client 102 is known to adopt certificate pinning for the server 104 with which the client 102 is attempting to establish a secure communication, then the INE 202 may determine not to issue a "Server hello" message to the client 102.

In any case, in response to an indication that the client 102 does adopt certificate pinning for the server 104 with which the client 102 is attempting to establish a secure connection, the mediation control component 304 sends a second control message 610 to the INE 202 indicating that the INE 202 should not proceed to issue a "Server hello" message to the client 102.

In response to receiving the second control message 610, the INE establishes a TCP connection with server 104 via TCP handshake 612.

Once the TCP connection between INE 202 and server 104 is established, the INE 202 forwards the "Client Hello" message 604 to server 104 as forwarded "Client Hello" message 614.

In response to receiving the forwarded "Client Hello" message 614, the server 104 sends "Server hello" message 616 to the INE 202. The "Server hello" message 616 comprises the server's choice of protocol version, a session ID, the cipher suite selected by the server, any extensions, and the server's certificate.

In response to receiving "Server hello" message 616, the INE 202 forwards the "Server hello" message 616 to the client 102 as forwarded "Server hello" message 618.

In response to receiving the message 618, the client 102 (which adopts certificate pinning) checks the certificate included in the message 618 against preconfigured data about the certificate of the server 104 with which it believes it is communicating. For example, the client 102 may calculate a hash value of the SPKI field of the certificate received in message 618, and compare it to a stored hash value of the SPKI field of the genuine certificate of the server 104. In the present example, the certificate provided in message 618 is the genuine certificate of the server 104, and so the client 102 will successfully authenticate the certificate provided by the INE 202 in message 618. The client 102 and the server 104 therefore proceed to exchange messages 620 to complete the SSL handshake, and hence establish a secure SSL connection there between.

Once the SSL connection has been established between client 102 and server 104, the client 102 and server 104 proceed to exchange application data 622, for example, the client may send a HTTPS content requests, and in response the server 104 may send an associated HTTPS response, including at least a portion of the requested content.

Note that the messages 620 and 622 are sent via the INE 202, i.e. the INE 202 forwards the messages 620 to their intended destination, but the INE 202 does not terminate the SSL connection between the client 102 and server 104. In other words, the communications between client 102 and server 104 bypass the INE 202, and no SSL/TLS functionality is invoked at the INE 202. However, the INE 202 still terminates the TCP connection between the client 102 and the server 104, i.e. there is one TCP connection between the client 102 and the INE 202, and another, separate TCP connection between the INE 202 and the server 104, over both of which the messages 602 and 622 are communicated.

Advantageously, by referring to the denied list 306 as described above, the INE 202 can predict whether a given client 102/server 104 combination will likely result in a rejection of an SSL handshake between the INE 202 and the client 102, and hence determine whether or not the INE 202 should attempt to terminate an SSL connection between the client 102 and the server 104. This allows for the INE 202 to INE SSL traffic transparently, even for clients 102 that adopt certificate pinning.

Figure 6:
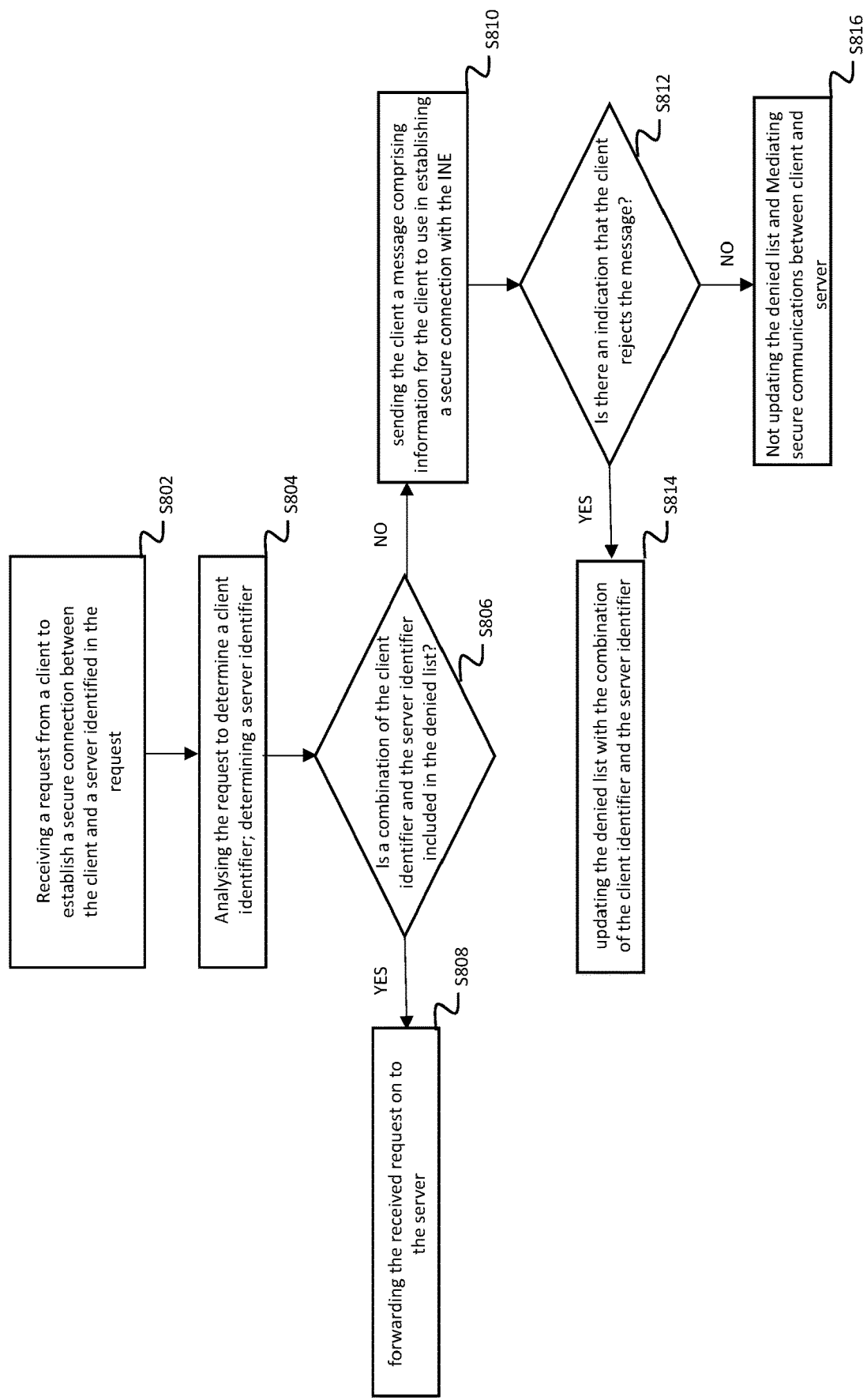
FIG. 6 illustrates an exemplary flow diagram according to an embodiment.

FIG. 6 illustrates schematically a flow diagram of steps of method for controlling secure communications in a communications network according to an exemplary embodiment of the present invention.

Referring now to FIG. 6, at step S802, the method comprises receiving, at an intermediate network element (INE) 202, a request from a client 102 to establish a secure connection between the client 102 and a server 104 identified in the request. This request may be for example, a client hello message of an SSL/TLS handshake to set up a secure SSL/TLS connection.

At step S804, the method comprises analyzing the received request to determine a client identifier identifying the client 102 to the INE 202. For example, the client identifier may be a concatenation of cypher suites list and an extension types list of the client hello message. The step S804 also comprises determining a server identifier identifying the server 104 to the INE 202. For example, the server identifier may be obtained from the Server Name Indication extension field of the client hello message, or from the destination IP address of the client hello message, or from the destination IP address of the IP packet encapsulating any TCP message sent from the client 102 intended for the server 104.

At step S806, the method comprises determining whether a combination of the determined client identifier and the determined server identifier is included in a blacklist (also referred to herein as denied list 306);

At step S808, the method comprises, responsive to a determination that the combination is included in the blacklist, forwarding the received request on to the server 104.

At step S810, the method comprises, responsive to a determination that the combination is not included in the blacklist, sending to the client 102, in response to the received request, a first message comprising information for the client 102 to use in establishing a secure connection with the INE 202. For example, this message may be a "server hello" message of an SSL/TLS handshake between the client 102 and the INE 202, and may therefore include the INE's certificate.

At step 812, the method comprises determining whether there is an indication that the client 102 rejects the message comprising information for the client 102 to use in establishing a secure connection with the INE 202. For example, it may be determined at the INE that the client 102 rejects the SSL/TLS handshake with the INE 202 by receiving an SSL alert message from the client 102. On the other hand, it may be determined at the INE 202 that the client 102 accepts the message comprising information for the client 102 to use in establishing a secure connection with the INE 202 by receiving a message from the client 102 continuing the SSL/TLS handshake, for example by receiving a "premaster secret" message from the client 102.

At step S814, the method comprises, responsive to an indication that the client rejects the message comprising information for the client 102 to use in establishing a secure connection with the INE 202, updating the blacklist with the combination of client identifier server identifier determined in S804.

At step S816, the method comprises, responsive to an indication that the client accepts the message comprising information for the client 102 to use in establishing a secure connection with the INE 202, not updating the blacklist with the combination and proceeding to mediate secure communications between the client 102 and the INE 202.

Figure 7:
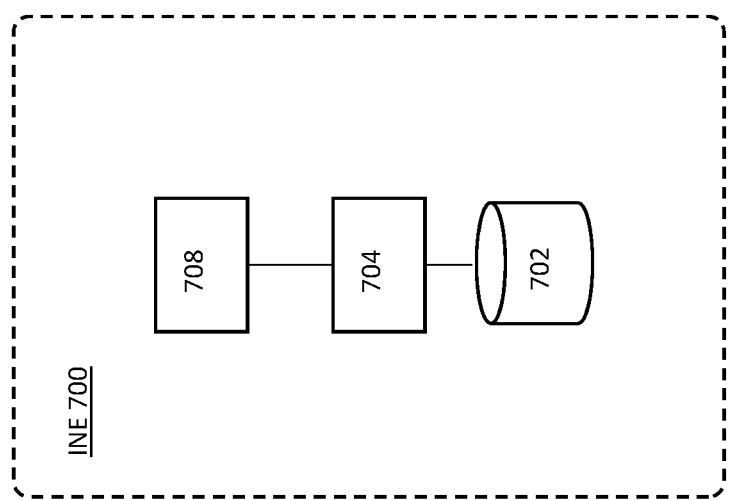
FIG. 7 illustrates schematically an exemplary intermediate network element.

FIG. 7 is a schematic diagram of the components of a computer 700 on which the INE 202 may be implemented according to an exemplary embodiment.

The computer 700 comprises processor 704, functionally connected to memory 702. The processor 704 is functionally connected to communications interface 780. The communications interface 708 communicates with UE 302-A, 302-B, 302-C, and server 104-A, 104-B, over a communications path, for example comprising a mobile network and components thereof (not shown) and/or a communication networks such as the internet 308.

The memory 702 stores denied list 306 and/or a computer program to cause the computer 700 to implement functions of the INE 202. The processor 704 processes data so as to implement, utilizing memory 702 and communications interface 708, the functions of the INE 202, for example, proxy functions, traffic mediation functions and/or mediation control 304 functions as described above.

It should be noted that although in the above reference is made to handshakes and connections according to the SSL protocol, other protocols may equally be used instead or in addition, such as Transport Layer Security (TLS) protocol, or any protocol in which a client/server handshake occurs before a connection is established there between.

In the above description, an INE 202 determined, based at least on a client identifier, whether to attempt to establish a first end-to-end secure connection between the client 102 and the INE 202. However, this need not necessarily be the case. In other examples, the client identifier is used to determine the identity of the client 102, as described below.

For example, as above, a client 102 sends a request (intended for a server 104) to establish a secure connection between the client 102 and the server 104. As above, this request may be a "client hello" message of a SSL or a TLS handshake, and comprise a cypher suites list and an extension types list. As above, an INE 202 receives (intercepts) this request message, and analyses it to determine a client identifier. For example, the determined client identifier may be a concatenation of the cypher suites list and the extension types list included in the received (intercepted) "client hello" message. As mentioned above, typically, the concatenation of the cipher suites list and the extension types list will be different for different clients, and so may be reliably used as a client identifier.

The INE 202 determines, based on the determined client identifier, an identity of the client 102. For example, the INE 202 has access to a data structure, such as a pre-stored table, comprising one or more client identifiers, each stored in association with a corresponding client identity.

The identity of the client 102 may be, for example, the name of the client 102, for example "Internet Explorer" (note "Internet Explorer" is a registered trade mark) or a shortened version of the client name such as "IE" or any representation thereof. The identity of the client 102 may comprise more specific information, such as a version number of the specific client 102 or the like. For example the identity of the client 102 may be "Internet Explorer v11.0" or the like, or a shortened version thereof such as "IEv11.0" or any representation thereof. The table is pre-populated with client identities (such as a client 102 name and version number) and their associated client identifier. For example, it may be determined in advance that a certain version of a certain client 102 will provide a certain cypher suites list and extension types list in a "client hello" message that it issues, and hence that the concatenation of the certain cypher suites list and extension types list is to be associated in the table with the certain version of the certain client 102.

The INE 202 compares the determined client identifier derived from the received (intercepted) message with client identifiers included in the table. If the determined client identifier matches a client identifier included in the table, then the INE 202 may determine that the identity of the client 102 is that identity in the table associated with the matched client identifier.

In such a way, the INE 202 can determine, for example from the "client hello" message alone, the identity of the client 102 sending the "client hello" message. As described above, the client 102 may be any application, such as a web browser or the like, running on a user equipment 302. A given user equipment 302 may run more than one client simultaneously, or at different times, and hence it will be appreciated that a user equipment identifier or user equipment identity may be of limited use with respect to identifying a particular client 102. Identifying the particular client 102 that has sent a request for secure communications (e.g. a "client hello" message of an SSL or TLS handshake) has many useful applications, for example for use in determining a policy to apply in further communications with the particular client 102.

The table may be stored at the INE 202, or may alternatively be stored elsewhere and accessible to the INE 202. The table may be continuously updated according to additional clients 102 or versions of existing clients 102 coming into use, or according to changes in the client identifier for a given client 102. If the INE 202 does not find a match in the table for a client identifier derived from a received message, the INE may flag, or otherwise alert, a system administrator that the particular client identifier is not included in the table, and hence that the table should be updated.

The table may also comprise client attributes associated with a client identity. For example, the table may indicate the type of client, for example "web browser", "mobile application", or an operating system with which the particular client is associated, or any other attributes associated with a particular client.

In some rare cases, one client identifier may map onto more than one client identity. In these rare cases, the INE 202 may determine a plurality of possible identities of the client that sent the received (intercepted) message.

In one example, two versions of the same particular client may have the same concatenation of cypher suites list and an extension types list. In this example, the INE 202 can still determine the client name (as it is common to both versions) and hence the identity of the client 102.

In another example, two different clients 102 may have the same concatenation of cypher suites list and/or an extension types list, and hence the INE 202 may determine that the identity of the client 102 may be one of two possibilities. In one example, additional information may then be used to determine which of the two possibilities is most likely to be the identity of the client 102. For example, the INE 202 may use information on the popularity, or total usage, of each client 102 to inform a determination of which of the two possibilities is most likely to be the client identity 102. Alternatively, having two possible client identities still excludes all other client identities from being considered as the identity of the client 102 that sent the request message, and hence even having two possible client identities can be useful, for example in making policy decisions based on the identity of the client.

It will be appreciated that the above described method of determining a client identity from a client identifier need not necessarily be conducted at the INE 202. Alternatively, the method could be conducted at the server 104. In this case, a request from the client to establish secure communications between the client 102 and the server 104 is received at the server 104, and the server 104 analyses the received request to determine a client identifier. The server 104 then determines, based on the determined client identifier, an identity of the client 102, similarly to as described above. In this example, the table would be accessible to the server 104. In this example therefore, there is no need for the INE 202.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for controlling secure communications in a communications network comprising a client, one or more servers and an intermediate network element between the client and the one or more servers, the method comprising:
   receiving, at the intermediate network element (INE), a request from the client to establish a secure connection between the client and a first server;
   analyzing the received request to determine a client identifier identifying the client to the INE;
   determining based at least on the determined client identifier whether the client uses certificate pinning, in which the client has stored preconfigured data about server certificates of the servers, wherein the client verifies that a server certificate is received from the corresponding server by use of the stored preconfigured certificate data of the servers;
   responsive to a determination that the client uses certificate pinning, forwarding by the INE, the received request on to the first or a second server; and
   responsive to a determination that the client does not use certificate pinning, sending to the client, in response to the received request, a first message comprising information for the client to use in establishing a secure connection with the INE, the information including an INE certificate associated with the INE;
   responsive to a determination that the client accepts the first message: establishing a first end-to-end secure connection between the INE and the client using the INE certificate; and
   establishing a second end to end secure connection between the INE and the first or second server.

2. The method according to claim 1, the method comprising:
   determining a server identifier identifying the first server to the INE; and
   wherein the determining whether the client uses certificate pinning is based on a combination of the determined client identifier and the determined server identifier.

3. The method according to claim 2, wherein the first server and the second server are the same.

4. The method according to claim 1, the method comprising:
   further to the forwarding of the received request on to the second server:
   receiving, from the second server, a second message comprising information for the client to use in establishing a secure connection with the second server; and
   forwarding the second message on to the client.

5. The method according to claim 4, the method comprising:
   forwarding subsequent communications from the client to the second server unaltered; and
   forwarding subsequent communications from the second server to the client unaltered.

6. The method according to claim 1, the method comprising:
   modifying, at the INE, one or more subsequent communications between the client and the second server.

7. The method according to claim 2, wherein:
determining based on a combination of the determined client identifier and the determined server identifier whether the client uses certificate pinning comprises determining whether the combination is included in a list of combinations accessible by the INE.

8. The method according to claim 7, comprising:
determining that the client has rejected the first message; and
responsive to determining that the client has rejected the first message, updating the list with the combination, wherein the list is a list of clients which use certificate pinning.

9. The method according to claim 8, wherein the determining whether the client rejects the first message is based on receiving a fourth message, from the client, indicating whether the client rejects or accepts the first message.

10. The method according to claim 9, wherein if the fourth message is an SSL Alert message, then it is determined that the client rejects the first message, and if the fourth message is a "pre-master secret" message of a SSL/TLS handshake, then it is determined that the client accepts the first message.

11. The method according to claim 1, the method comprising establishing a Transmission Control Protocol (TCP) connection between the client and the INE,
wherein the INE is a proxy server; and
wherein the received request is a "client hello" message of a Secure Sockets Layer (SSL) or a Transport Layer Security (TL) handshake.

12. The method according to claim 11, wherein the received request is a "client hello" message of a Secure Sockets Layer (SSL) or a Transport Layer Security (TLS) handshake, and wherein the client identifier is a concatenation of a cypher suites list and an extension types list of the "client hello" message.

13. The method according to claim 2, wherein the server identifier identifying the server to the INE is determined by analyzing the received request.

14. The method according to claim 13, wherein the server identifier is a Server Name Indication (SNI) extension of the received request.

15. The method according to claim 1, wherein the first message is a "server hello" message of a SSL or TLS handshake associated with the INE.

16. The method according to claim 15, wherein the "server hello" message comprises a certificate associated with the INE.

17. The method according to claim 1, wherein the secure connection between the INE and the client is one of a Secure Sockets Layer (SSL) connection and a Transport Layer Security (TLS) connection,
wherein the client is an application running on a user equipment.

18. An apparatus comprising:
at least one processor;
and at least one memory including computer program code;
the at least one memory and the computer program code being configured to, with the at least one processor, cause the apparatus at least to perform a method of controlling secure communications in a communications network comprising a client, one or more servers and an intermediate network element between the client and the one or more servers, the method comprising:
receiving, at the intermediate network element (INE), a request from the client to establish a secure connection between the client and a first server;
analyzing the received request to determine a client identifier identifying the client to the INE;
determining based at least on the determined client identifier the client uses certificate pinning, in which the client has stored preconfigured data about server certificates of the servers, wherein the client verifies that a server certificate is received from the corresponding server by use of the stored preconfigured certificate data of the servers;
responsive to a determination that the client uses certificate pinning, forwarding by the INE, the received request on to the first or a second server; and
responsive to a determination that the client does not use certificate pinning, sending to the client, in response to the received request, a first message comprising information for the client to use in establishing a secure connection with the INE, the information including an INE certificate associated with the INE;
responsive to a determination that the client accepts the first message:
establishing a first end-to-end secure connection between the INE and the client using the INE certificate; and
establishing a second end to end secure connection between the INE and the first or second server.

19. A non-transitory computer readable storage medium comprising a set of computer readable instructions stored thereon, which, when executed by a processing system, cause the system to implement a method of controlling secure communications in a communications network comprising a client, one or more servers and an intermediate network element between the client and the one or more servers, the method comprising:
receiving, at the intermediate network element (NE), a request from the client to establish a secure connection between the client and a first server;
analyzing the received request to determine a client identifier identifying the client to the INE;
determining based at least on the determined client identifier whether the client uses certificate pinning, in which the client has stored preconfigured data about server certificates of the servers, wherein the client verifies that a server certificate is received from the corresponding server by use of the stored preconfigured certificate data of the servers;
responsive to a determination that the client uses certificate pinning, forwarding by the INE, the received request on to the first or a second server; and
responsive to a determination that the client does not use certificate pinning, sending to the client, in response to the received request, a first message comprising information for the client to use in establishing a secure connection with the INE, the information including an INE certificate associated with the INE;
responsive to a determination that the client accepts the first message:
establishing a first end-to-end secure connection between the INE and the client using the INE certificate; and
establishing a second end to end secure connection between the INE and the first or second server.

* * * * *